(12) United States Patent
Shin et al.

(10) Patent No.: US 11,658,342 B2
(45) Date of Patent: May 23, 2023

(54) NON-AQUEOUS ELECTROLYTE SOLUTION AND LITHIUM SECONDARY BATTERY INCLUDING THE SAME

(71) Applicant: LG Chem, Ltd., Seoul (KR)

(72) Inventors: Won Kyung Shin, Daejeon (KR); Kyoung Ho Ahn, Daejeon (KR); Chul Haeng Lee, Daejeon (KR); Jeong Woo Oh, Daejeon (KR)

(73) Assignee: LG Energy Solution, Ltd.

( * ) Notice: Subject to any disclaimer, the term of this patent is extended or adjusted under 35 U.S.C. 154(b) by 234 days.

(21) Appl. No.: 16/770,833

(22) PCT Filed: Mar. 6, 2019

(86) PCT No.: PCT/KR2019/002605
§ 371 (c)(1),
(2) Date: Jun. 8, 2020

(87) PCT Pub. No.: WO2019/172650
PCT Pub. Date: Sep. 12, 2019

(65) Prior Publication Data
US 2021/0151799 A1 May 20, 2021

(30) Foreign Application Priority Data
Mar. 6, 2018 (KR) .................. 10-2018-0026545

(51) Int. Cl.
| H01M 10/0568 | (2010.01) |
| H01M 10/0525 | (2010.01) |
| H01M 10/0567 | (2010.01) |

(52) U.S. Cl.
CPC ... *H01M 10/0568* (2013.01); *H01M 10/0525* (2013.01); *H01M 10/0567* (2013.01)

(58) Field of Classification Search
CPC ......... H01M 10/0568; H01M 10/0525; H01M 10/0567
USPC ........................................................ 429/322
See application file for complete search history.

(56) References Cited

U.S. PATENT DOCUMENTS

| 6,190,805 | B1 | 2/2001 | Takeuchi et al. |
| 10,476,104 | B2 | 11/2019 | Ahn et al. |
| 2001/0011119 | A1 | 8/2001 | Naijo et al. |
| 2002/0161146 | A1 | 10/2002 | Naijo et al. |
| 2004/0009396 | A1 | 1/2004 | Kim et al. |
| 2011/0151317 | A1 | 6/2011 | Giroud et al. |
| 2011/0206979 | A1 | 8/2011 | Giroud et al. |
| 2013/0017456 | A1 | 1/2013 | Sugimoto et al. |
| 2013/0164604 | A1 | 6/2013 | Matsumoto et al. |
| 2013/0224606 | A1 | 8/2013 | Koh et al. |
| 2015/0171476 | A1 | 6/2015 | Onozaki et al. |
| 2015/0180024 | A1* | 6/2015 | Nose ............... H01M 4/5805 429/223 |
| 2016/0028110 | A1 | 1/2016 | Yu et al. |
| 2016/0087306 | A1 | 3/2016 | Lee et al. |
| 2016/0294005 | A1 | 10/2016 | Lee et al. |
| 2017/0229735 | A1 | 8/2017 | Ahn et al. |

FOREIGN PATENT DOCUMENTS

| CN | 102089924 A | 6/2011 | |
| CN | 103222102 A | 7/2013 | |
| CN | 104364946 A | 2/2015 | |
| CN | 105552430 A | 5/2016 | |
| CN | 107078342 A | 8/2017 | |
| JP | H08185847 A | 7/1996 | |
| JP | 2005056857 A | 3/2005 | |
| JP | 2008120714 A | 5/2008 | |
| JP | 2011216332 A * | 10/2011 | |
| JP | 2012018860 A | 1/2012 | |
| JP | 2012501060 A | 1/2012 | |
| JP | 2014164801 A | 9/2014 | |
| JP | 2015537352 A | 12/2015 | |
| JP | 2017532742 A | 11/2017 | |
| KR | 20090004135 A | 1/2009 | |
| KR | 20110038037 A | 4/2011 | |
| KR | 20110080324 A | 7/2011 | |
| KR | 20150079586 A | 7/2015 | |
| KR | 20160040127 A | 4/2016 | |
| KR | 20170029487 A | 3/2017 | |
| KR | 101798259 B1 | 11/2017 | |
| WO | 2008078626 A1 | 7/2008 | |
| WO | 2012029420 A1 | 3/2012 | |
| WO | WO-2016053065 A1 * | 4/2016 | .......... H01M 10/052 |
| WO | 105655637 A * | 6/2016 | |
| WO | WO-2018044129 A1 * | 3/2018 | ................ C08J 5/22 |

OTHER PUBLICATIONS

Machine Translation of JP-2011216332-A (Year: 2011).*
Machine Translation of WO-2016053065-A1 (Year: 2016).*
Machine Translation of CN-105655637-A (Year: 2016).*
WO2018044129A1 (machine translation) (Year: 2018).*
Donato et al., "Recent Applications of Ionic Liquids in the Sol-Gel Process for Polymer-Silica Nanocomposites with Ionic Interfaces," Colloids and Interfaces, Nov. 10, 2017, pp. 1-25, vol. 1, No. 5.
International Search Report for Application No. PCT/KR2019/002605 dated Jun. 19, 2019, 2 pages.
European Search Report for Application No. EP 19763453.8, dated Dec. 2, 2020, 7 pages.

* cited by examiner

*Primary Examiner* — William E Mcclain
*Assistant Examiner* — Paul Christian St Wyrough
(74) *Attorney, Agent, or Firm* — Lerner David LLP

(57) ABSTRACT

A non-aqueous electrolyte solution and a lithium secondary battery including the same are disclosed herein. In some embodiments, the non-aqueous electrolyte solution includes an ionic solution containing at least one anion selected from the group consisting of a bis(fluorosulfonyl)imide anion and a bis(trifluoromethane)sulfonylimide anion, a cation, a non-aqueous solvent, a lithium salt, a phosphite-based additive, and a surfactant including an oligomer represented by Formula 1.

11 Claims, No Drawings

NON-AQUEOUS ELECTROLYTE SOLUTION AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2019/002605, filed on Mar. 6, 2019, which claims the benefit of Korean Patent Application No. 10-2018-0026545, filed on Mar. 6, 2018, the disclosures of which are incorporated by reference herein.

TECHNICAL FIELD

The present invention relates to a non-aqueous electrolyte solution and a lithium secondary battery including the same, and more specifically, to a non-aqueous electrolyte solution and a lithium secondary battery including the same having an improved high-temperature safety while maintaining the capacity characteristics and life characteristics of the battery at a certain level or more.

BACKGROUND ART

Demands for secondary batteries as an energy source have been significantly increased as technology development of and demands for mobile devices have increased, and among such secondary batteries, lithium secondary batteries having high energy density and voltage have been commercialized and widely used.

A lithium secondary battery is produced by a process in which an electrode assembly is prepared by coating current collectors with a positive electrode active material and a negative electrode active material to appropriate thicknesses or forming an active material itself to have a film shape having an appropriate length, and then winding or laminating the resultant product together with an insulating separator, the electrode assembly is put into a can or a container similar thereto, and an electrolyte is then injected into the can or container.

Generally, a lithium metal oxide is used as the positive active material, and a lithium metal, a lithium alloy, crystalline or amorphous carbon, or a carbon composite is used as the negative active material. In addition, generally, an electrolyte solution in which an appropriate amount of salt is dissolved in a non-aqueous organic solvent is mainly used, and the electrolyte solution may employ, for example, ethylene carbonate, propylene carbonate, dimethoxyethane, gamma butyrolactone, N,N-dimethylformamide, tetrahydrofuran or acetonitrile.

However, storing an organic solvent at a high temperature for a long period of time may cause oxidation reaction and generate gas to deform the stable structure of a battery, and also leads to internal short circuit when heat is generated inside the battery due to overcharge or overdischarge, thereby raising a problem such as ignition or explosion of the battery.

To solve the problem, there is proposed a method of using a separator having a high-melting point. However, there is a problem in that the thickness of the separator has to be increased in order to elevate the melting point of the separator. Moreover, there is a limitation in that since a polyolefin-based film generally used as a separator has a melting point of about 150° C., when heat is rapidly generated inside a battery by the oxidation reaction of the electrolyte solution upon overcharging, it is still difficult to suppress the ignition and explosion of the battery caused by the internal short circuit of the battery.

Thus, there is a need to develop an electrolyte solution which has excellent oxidation stability, and is capable of effectively suppressing the ignition of the battery and/or the explosion phenomenon.

(Patent document 0001) Japanese Patent Application Laid-open Publication No. 1996-185847

DISCLOSURE OF THE INVENTION

Technical Problem

To solve the above-mentioned problem, the present invention provides a non-aqueous electrolyte solution, and a lithium secondary battery including the same, the non-aqueous electrolyte solution having excellent high-temperature safety while being capable of maintaining capacity characteristics and life characteristics of a battery to at least a certain level.

Technical Solution

In an aspect, the present invention provides a non-aqueous electrolyte solution for a lithium secondary battery, the electrolyte solution comprising: an ionic solution including at least one anion selected from the group consisting of a bis(fluorosulfonyl) imide anion and a bis(trifluoromethane) sulfonyl imide anion and a cation; a lithium salt; a phosphite-based additive; and a surfactant including an oligomer represented by Formula 1 below.

[Formula 1]

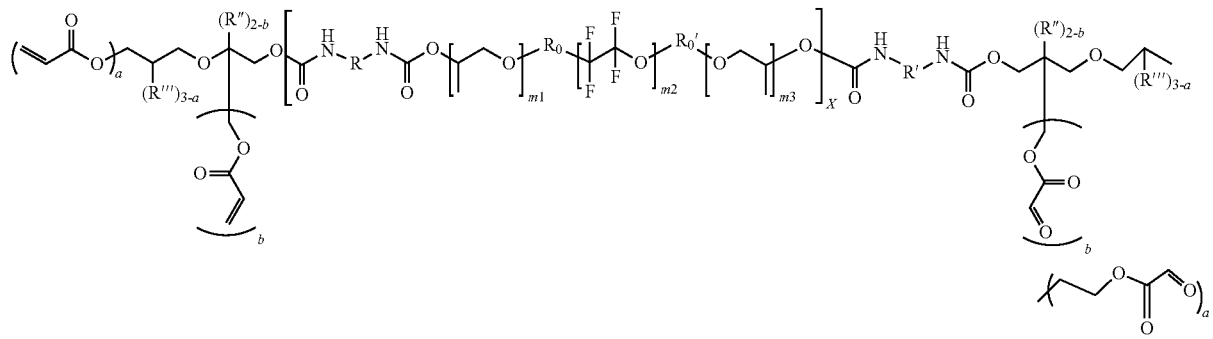

In Formula 1, $R_0$ and $R_0'$ are each independently a substituted or unsubstituted alkylene group having 1 to 5 carbon atoms, R and R' are each independently an aliphatic, alicyclic or aromatic hydrocarbon group, R" and R''' are each independently hydrogen or an alkyl group having 1 to 3 carbon atoms, a is an integer of 1 to 3, b is an integer of 0 to 2, m1 and m3 are each independently an integer selected from among 1 to 15, m2 is an integer selected from among 1 to 10, and x is an integer selected from among 1 to 15.

In another aspect, the present invention provides a lithium secondary battery comprising a positive electrode, a negative electrode, a separator disposed between the positive electrode and the negative electrode and the non-aqueous electrolyte solution for a secondary battery.

Advantageous Effects

A non-aqueous electrolyte solution for a lithium secondary battery according to the present invention uses, as a solvent for non-aqueous electrolyte solution, an ionic solution which has excellent electrochemical safety and is flame-retardant, and also uses a phosphite-based additive capable of suppressing a side reaction of the electrolyte by removing oxygen radicals. As a result, a non-aqueous electrolyte solution for the lithium secondary battery having improved high-temperature safety may be prepared.

Furthermore, the wettability of the electrolyte solution may be improved by using, as a surfactant, an oligomer in which fluorine is substituted, and therefore capacity characteristics and life characteristics of a battery may be maintained to at least a certain level.

BEST MODE FOR CARRYING OUT THE INVENTION

Hereinafter, the present invention will be described in more detail to allow for understanding of the present invention. Here, it will be understood that terms or words used in the specification and claims should not be construed as a general or dictionary definition but are to be construed meaning and concepts meeting the technical spirits of the present invention based on a principle that the inventors may properly define the concepts of terms in order to describe their own invention in best mode.

When the term 'include/comprise', 'have', 'consist of', etc. referred herein are used, other part may be added unless 'only' is not used otherwise. When an element is expressed in a singular form, the element may be provided in plurality as well, unless the context clearly indicates otherwise.

When construing of an element, it is construed to include the margin of error even if there is no additional explicit statement.

In the present description, ⌈X to Y⌋ which represents the range, means ⌈X or more and Y or less⌋.

Hereinafter, a non-aqueous electrolyte solution according to the present invention will be explained.

Non-Aqueous Electrolyte Solution

The non-aqueous electrolyte solution according to the present invention includes: an ionic solution containing an anion, a cation, and a non-aqueous solvent; a lithium salt; a phosphite-based additive; and a surfactant. Each component of a composition for the non-aqueous electrolyte solution according to the present invention will be explained below.

A conventionally used electrolyte solution for a lithium secondary battery uses an organic solvent, in which a portion of lithium salt is included, in order to improve conductivity, but there is a problem in that oxidation reaction of the electrolyte solution occurs when the lithium salt is included.

When the electrolyte solution causes the oxidation reaction, the internal temperature of the battery increases due to the heat of reaction generated by the oxidation reaction, and may reach a temperature which is equal to or greater than the ignition point. Here, when ambient oxygen is involved, there is a problem in that ignition and thermal-runaway may occur, thereby leading to an explosion of the lithium secondary battery. To solve this problem, research has been continuously conducted on a method for suppressing the oxidation reaction of an electrolyte solution.

Therefore, in the present invention, an ionic solution, which is electrochemically safe and has oxidation resistance, is used as a non-aqueous electrolyte solution solvent, so that an electrolyte solution oxidative degradation reaction may be suppressed, and a phosphite-based additive is used, so that the generation of oxygen radicals generated during the oxidative degradation reaction may be suppressed. Consequently, a non-aqueous electrolyte solution for a lithium secondary battery having excellent life characteristics and capacity characteristics of a battery may be provided.

Specifically, in a non-aqueous electrolyte solution for a lithium secondary battery according to an embodiment of the present invention, the anion contained in the ionic solution may include at least one anion selected from the group consisting of a bis(fluorosulfonyl)imide anion (FSI anion) and a bis(trifluoromethane)sulfonylimide anion (TFSI anion).

In addition, the cation included in the ionic solution may include at least one cation selected from the group consisting of cations represented by Formulae 2-1 to 2-5 below.

[Formula 2-1]

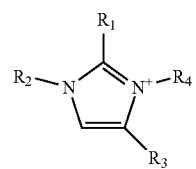

In Formula 2-1, $R_1$, $R_2$, $R_3$ and $R_4$ are each independently hydrogen or an alkyl group having 1 to 10 carbon atoms.

[Formula 2-2]

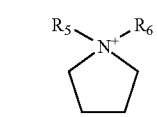

In Formula 2-2, $R_5$ and $R_6$ are each independently hydrogen or an alkyl group having 1 to 10 carbon atoms.

[Formula 2-3]

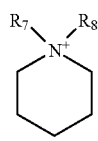

In Formula 2-3, $R_7$ and $R_8$ are each independently hydrogen or an alkyl group having 1 to 10 carbon atoms.

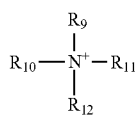
[Formula 2-4]

In Formula 2-4, $R_9$, $R_{10}$, $R_{11}$ and $R_{12}$ are each independently hydrogen or an alkyl group having 1 to 10 carbon atoms.

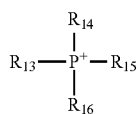
[Formula 2-5]

In Formula 2-5, $R_{13}$, $R_{14}$, $R_{15}$ and $R_{16}$ are each independently hydrogen or an alkyl group having 1 to 10 carbon atoms.

For example, the cation represented by Formula 2-1 may be at least one cation selected from the group consisting of cations represented by Formulae 2-1a and 2-1b below.

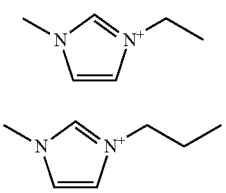
[Formula 2-1a]

[Formula 2-1b]

For example, the cation represented by Formula 2-2 may be at least one cation selected from the group consisting of cations represented by Formulae 2-2a and 2-2b below.

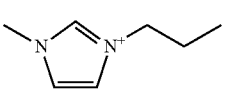
[Formula 2-2a]

[Formula 2-2b]

For example, the cation represented by Formula 2-3 may be at least one cation selected from the group consisting of cations represented by Formulae 2-3a and 2-3b below.

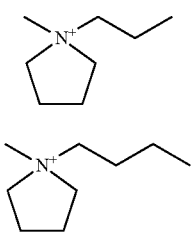
[Formula 2-3a]

[Formula 2-3b]

For example, the cation represented by Formula 2-5 may be a cation represented by Formula 2-5a below.

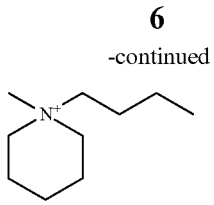
[Formula 2-5a]

Meanwhile, the non-aqueous solvent is a solvent, which is commonly used in an electrolyte solution for a lithium secondary battery, and, as the non-aqueous solvent, for example, an ether, an ester (acetates, propionates), an amide, a linear carbonate or a cyclic carbonate, and a nitrile (acetonitrile, SN, etc.), may be used in a mixture of at least two thereof or alone.

Among them, a carbonate-based electrolyte solvent including a cyclic carbonate, a linear carbonate or a carbonate compound which is a mixture thereof, may be used representatively.

Particular examples of the cyclic carbonate compound are a single compound or a mixture including at least two compounds selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and halides thereof. In addition, as particular examples of the linear carbonate compound, a compound or a mixture including at least two compounds selected from the group consisting of dimethyl carbonate (DMC), diethyl carbonate (DEC), dipropyl carbonate (DPC), ethylmethyl carbonate (EMC), methylpropyl carbonate, and ethyl propyl carbonate (EPC), may representatively be used, but is not limited thereto.

Particularly, among the carbonate-based electrolyte solvents, propylene carbonate and ethylene carbonate, which are cyclic carbonates, are organic solvents having high viscosity, and have a high dielectric constant and cause lithium salts in an electrolyte to be dissociated well, so that the propylene carbonate and the ethylene carbonate may preferably be used. It is more preferable to use such cyclic carbonates mixed with a linear carbonate having low viscosity and low dielectric constant (for example, ethyl methyl carbonate, diethyl carbonate or dimethyl carbonate) in an appropriate ratio, so that an electrolyte solution with high conductivity may be prepared.

In addition, among the electrolyte solvents, the ester may employ a single compound or a mixture including at least two selected from the group consisting of methyl acetate, ethyl acetate, propyl acetate, methyl propionate, ethyl propionate, γ-butyrolactone, γ-valerolactone, γ-caprolactone, α-valerolactone, and ε-caprolactone, but is not limited thereto.

With respect to 100 parts by weight of a non-aqueous electrolyte solution for a lithium secondary battery, the ionic solution may be included in an amount of 1 to 50 parts by weight, preferably 5 to 40 parts by weight, and more preferably 10 to 30 parts by weight.

Next, the lithium salt is used to provide lithium ions in a lithium secondary battery. For example, the lithium salt may employ those of conventionally used in an electrolyte solution for a lithium secondary battery without limitation. For example, the lithium salt may include $Li^+$ as the cation, and include, as anion, at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2^-$—, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$ and $(CF_3CF_2SO_2)_2N^-$. More particularly, an anion included in the lithium salt may be at least one anion selected from the group consisting of $PF_6^-$, $(CF_3SO_2)_2N^-$ and $(FSO_2)_2N^-$. The lithium salt may employ one type or if needed, a mixture of at least two types.

The concentration of the lithium salt may be 0.5 M or more, particularly 0.5 M to 4 M, particularly 0.7 M to 4 M, and more particularly 0.9 M to 3 M.

When the concentration of the lithium salt satisfies the above-mentioned range, high ion transfer characteristics of lithium cations (Li+) (that is, a transference number of cations) is ensured due to an increase in number of lithium cations present in a non-aqueous electrolyte solution, and thus the problem of deteriorating the reduction safety of an ionic solution may be alleviated. Thus, an improvement effect of output characteristics of the lithium secondary battery may be achieved. Also, it is possible to prevent an exothermic reaction at a high temperature from occurring at the beginning of the reaction by adding a flame-retardancy improving effect. Here, when the concentration of an electrolyte salt is 4 M or more, the viscosity of the electrolyte salt significantly increase so that the transfer rate of the lithium ions is hard to be ensured, the wettability of the electrolyte solution is degraded, and thus the battery performance may be degraded undesirably.

Next, the phosphite-based additive is for removing oxygen radicals generated by oxidation reaction of an electrolyte solution and collapse reaction of a positive electrode at a high temperature. Specifically, the collapse reaction of the positive electrode means a phenomenon in which oxygen present in the positive electrode is discharged in the form of oxygen radicals at a high temperature, and thus the positive electrode structure is collapsed. Meanwhile, when oxygen radicals are generated, the phosphite-based additive reacts with the oxygen radicals to remove the oxygen radicals while forming a phosphate, and thus acts as an $O_2$ radical scavenger, thereby suppressing oxygen radicals from being serially formed (see Reaction Formula 1 below).

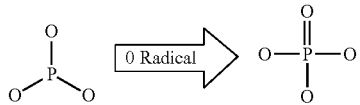

As one specific example, a compound represented by Formula 3-1 below may be used as the phosphite-based additive.

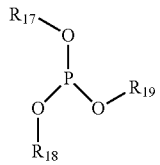

[Formula 3-1]

In Formula 3-1, $R_{17}$, $R_{18}$ and $R_{19}$ are each independently at least one functional group selected from the group consisting of hydrogen, fluorine, chlorine, bromine, iodine, —$CF_3$, —$CH_2CF_3$, —$CF_2CCl_3$, —$C(CF_3)_3$, —$C(CF_2F_3)_3$, —$Si(CH_3)_3$, —$Si(CH_2CH_3)_3$, —$Si(CF_3)_3$, —$Si(CF_2CF_3)_3$, —$CCl_3$, —$CCl_2CCl_3$, —$C(CCl_3)_3$, —$C(CCl_2Cl_3)_3$, —$CBr_3$, —$CBr_2CBr_3$, —$C(CBr_3)_3$, —$C(CBr_2Br_3)_3$, —$CI_3$, —$CI_2CI_3$, —$C(CI_3)_3$ and —$C(CI_2CI_3)_3$.

More specifically, a compound represented by Formula 3-1 may be at least one compound selected from the group consisting of Formulae 3-1a and 3-1b below.

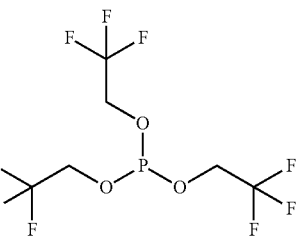

[Formula 3-1a]

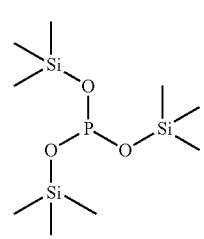

[Formula 3-1b]

With respect to 100 parts by weight of a non-aqueous electrolyte solution for a lithium secondary battery, the phosphite-based additive may be included in an amount of 1 to 30 parts by weight, preferably 2 to 25 parts by weight, and more preferably 5 to 20 parts by weight. When the content of the phosphite-based additive satisfies the above-mentioned range, the generation of oxygen radicals may be suppressed, thereby improving high-temperature safety and minimizing the side reaction.

Next, a surfactant including an oligomer represented by Formula 1 is for improving the capacity characteristics and life characteristics of the battery by improving the wettability of a non-aqueous electrolyte solution for a lithium secondary battery.

[Formula 1]

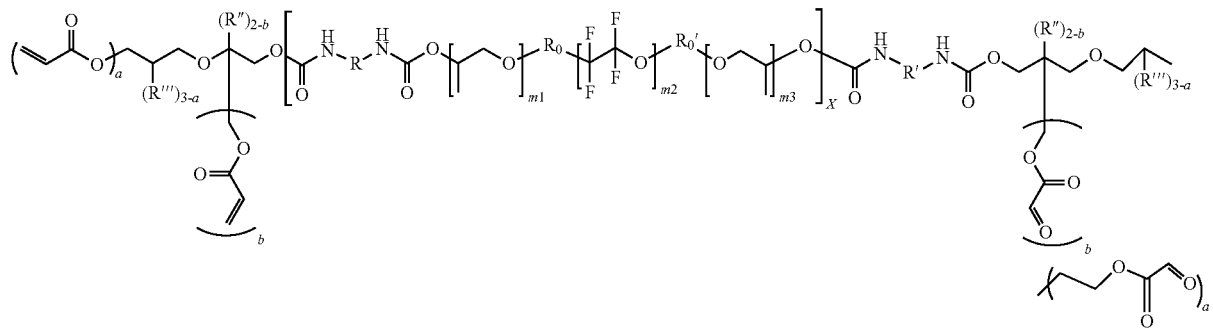

In Formula 1, $R_0$ and $R_0'$ are each independently a substituted or unsubstituted alkylene group having 1 to 5 carbon atoms, R and R' are each independently an aliphatic, alicyclic or aromatic hydrocarbon group, R" and R'" are each independently hydrogen or an alkyl group having 1 to 3 carbon atoms, a is an integer of 1 to 3, and b is an integer of 0 to 2. m1 and m3 are each independently an integer selected from among 1 to 15, and preferably an integer selected from among 5 to 10. m2 is an integer selected from among 1 to 10, and preferably an integer selected from among 1 to 5.

x is an integer selected from among 1 to 15, and preferably an integer selected from among 1 to 10.

Since an oligomer represented by Formula 1 contains a urethane group (—NHC(O)O—) in the main chain, the oligomer has excellent solubility in the ionic solution, and contains, in the main chain, a unit containing fluorine (F) having hydrophobicity, and has (meth)acrylate having hydrophilicity at the end of the main chain. Thus, when the oligomer is included, a polyolefin-based compound as a component for a separator in a battery also has hydrophobicity, so that the wettability of an electrolyte solution is improved by a hydrophobic unit of the oligomer. When the wettability of the electrolyte is improved, the electrolyte can be uniformly positioned in the battery, so that the polarization phenomenon that may occur during charging and discharging of the lithium secondary battery can be minimized, thereby improving the life characteristics of the battery.

As a specific example, the oligomer represented Formula 1 may be an oligomer represented by Formula 1a below.

With respect to 100 parts by weight of the non-aqueous electrolyte solution, the oligomer represented by Formula 1 may be included in an amount of 0.01 parts by weight to 10 parts by weight, and preferably 0.5 parts by weight to 10 parts by weight. When the content of the oligomer represented by Formula 1 satisfies the above-mentioned range, the wettability of the non-aqueous electrolyte solution containing an ionic solution can be improved while minimizing the resistance of the lithium secondary battery, the transfer of the lithium ions, and the resultant decrease in ionic conductivity.

The weight-average molecular weight (Mw) of the oligomer represented by Formula 1 may be controlled by the number of repeating units constituting the oligomer, and may be 1,000 g/mol to 100,000 g/mol, specifically 1,000 g/mol to 50,000 g/mol, and more specifically 1,000 g/mol to 10,000 g/mol. When the weight-average molecular weight (Mw) of the oligomer is within the above-mentioned range, the affinity between the oligomer and the ionic solution is improved so that the solubility of the oligomer is improved, and the surface tension between the electrolyte and the separator using the hydrophobic compound is decreased, thereby improving the electrolyte wetting phenomenon.

The weight-average molecular weight herein may mean a conversion value in terms of standard polystyrene as measured by gel permeation chromatograph (GPC), and unless otherwise specified, a molecular weight may mean a weight-average molecular weight. For example, in the present invention, as the GPC condition, measurement is carried out

[Formula 1a]

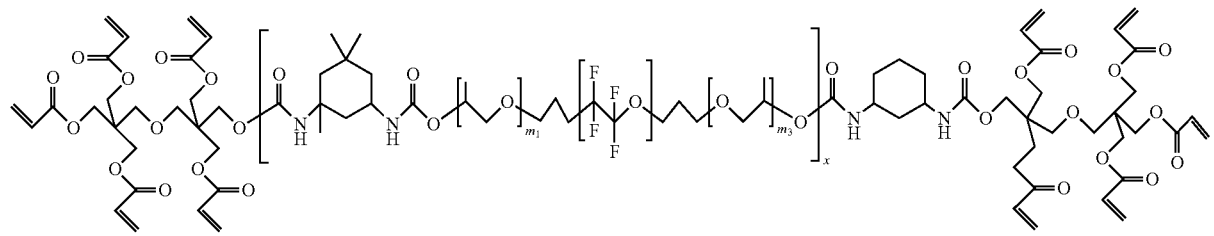

In Formula 1a, m1 and m3 are each independently an integer selected from among 1 to 15, and preferably an integer selected from among 3 to 15, x is an integer selected from among 1 to 15, and preferably an integer selected from among 1 to 10.

by using the Agilent 1200 series, the column used here may be a PL mixed B column of Agilent Co., and THF may be used as a solvent.

In addition, the non-aqueous electrolyte solution according to the present invention may further include other additives to suppress a side reaction on films formed on the surfaces of a positive electrode and a negative electrode. Specifically, the non-aqueous electrolyte solution may further include, for example, at least one compound selected from the group consisting of N,N'-dichlorohexylcarbodiimide (DCC), vinylene carbonate, saturated sultone, cyclic sulfite, acyclic sulfone, an alkylsilyl compound and an inorganic compound.

The dichlorohexylcarbodiimide (DCC) suppresses the formation of HF, which is generated when the lithium salt is ionized, and the formation of by-products generated from salt anions, and ultimately suppresses the side reaction at film on the negative electrode and positive electrode films, thereby expecting an effect of resistance improvement.

Representative examples of the saturated sultone may employ 1,3-propane sultone (PS), or 1,4-butane sultone, and representative examples of unsaturated sultone, may employ ethene sultone, 1,3-propenesultone, 1,4-butene sultone, or 1-methyl-1,3-propenesultone.

Representative examples of the cyclic sulfite may employ ethylene sulfite (Esa), methyl ethylene sulfite, ethyl ethylene sulfite, 4,5-dimethylethylene sulfite, 4,5-diethyl ethylene sulfite, propylene sulfite, 4,5-dimethylpropylene sulfite, 4,5-diethylpropylene sulfite, 4,6-dimethylpropylene sulfite, 4,6-diethylpropylene sulfite or 1,3-butylene glycol sulfite.

Lithium Secondary Battery

Next, the lithium secondary battery according to the present invention will be explained.

A lithium secondary battery according to the present invention includes a negative electrode, a positive electrode, a separator disposed between the positive electrode and the negative electrode, and a non-aqueous electrolyte solution for the lithium secondary battery.

Particularly, the lithium secondary battery may be manufactured by injecting the non-aqueous electrolyte solution for a lithium secondary battery according to the present invention into an electrode assembly in which the positive electrode, the negative electrode, and the separator disposed between the positive electrode and the negative electrode are sequentially laminated.

Here, the positive electrode, the negative electrode, and the separator, which constitute the electrode assembly, may employ any of those conventionally manufactured and used in the manufacture of the lithium secondary battery.

First, the positive electrode may be manufactured by forming a positive electrode mixture layer on a positive electrode current collector. The positive electrode mixture layer may be formed by coating the positive electrode current collector with a positive electrode slurry including a positive electrode active material, a binder, a conductive agent, and a solvent, and then drying and rolling the coated positive electrode current collector.

The positive electrode current collector is not particularly limited so long as having conductivity without causing chemical changes in the battery, and, for example, may employ stainless steel, aluminum, nickel, titanium, fired carbon, or aluminum or stainless steel that is surface-treated with carbon, nickel, titanium, silver, or the like.

In addition, the positive electrode active material is a compound capable of reversibly intercalating and deintercalating lithium, and may particularly include a lithium composite metal oxide including lithium and one or more metals such as cobalt, manganese, nickel or aluminum. More particularly, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (where $0<Y<1$), $LiMn_{2-z}Ni_zO_4$ (where $0<Z<2$), etc.), a lithium-nickel-cobalt-based oxide (e.g., $LiNi_{1-Y1}Co_{Y1}O_2$ (where $0<Y1<1$), etc.), a lithium-manganese-cobalt-based oxide (e.g., $LiCo_{1-Y2}Mn_{Y2}O_2$ (where $0<Y2<1$), a $LiMn_{2-z1}Co_{z1}O_4$ (where $0<Z1<2$), etc.), a lithium-nickel-manganese-cobalt-based oxide (e.g., $Li(Ni_pCo_qMn_{r1})O_2$ (where $0<p<1$, $0<q<1$, $0<r<1$, and $p+q+r=1$, etc.), or a $Li(Ni_{p1}Co_{q1}Mn_{r2})O_4$ (where $0<p1<2$, $0<q1<2$, $0<r2<2$, $p1+q1+r2=2$), etc.), or a lithium-nickel-cobalt-transition metal (M) oxide (e.g., $Li(Ni_{p2}Co_{q2}Mn_{r3}M_{s2})O_2$ (where M is selected from the group consisting of Al, Fe, V, Cr, Ti, Ta, Mg and Mo, and p2, q2, r3 and s2 are atomic fractions of each independent elements, wherein $0<p2<1$, $0<q2<1$, $0<r3<1$, $0<s2<1$, and $p2+q2+r3+s2=1$), etc.), and may include any one thereof or a compound of two or more thereof.

Among the above-listed compounds, in terms of increasing the capacity characteristics and stability of a battery, the lithium composite metal oxide may be $LiCoO_2$, $LiMnO_2$, $LiNiO_2$, a lithium nickelmanganesecobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, etc.), or a lithium nickelcobaltaluminum oxide (e.g., $Li(Ni_{0.8}Co_{0.15}Al_{0.05})O_2$, etc.), etc.

The positive electrode active material may be included in an amount 70 to 98 wt %, and specifically 80 to 98 wt %, based on a total solid content of the positive electrode slurry.

The binder is a component that assists in binding between an active material and a conductive agent, and in binding with a current collector, and specifically, may employ, polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluorine rubber, and various copolymers thereof, etc.

The binder is added in an amount 1 to 15 wt %, and specifically 1 to 10 wt %, based on a total solid content of the positive electrode slurry.

In addition, the conductive agent is not particularly limited as long as having a conductivity without causing chemical changes in the battery, and may employ, for example, a conductive agent such as: carbon powder such as carbon black, acetylene black, Ketjen black, channel black, furnace black, lamp black, and thermal black; graphite powder such as natural graphite, artificial graphite, or graphite having highly developed crystal structure; conductive fibers such as carbon fibers and metal fibers; metal powder such as carbon fluoride powder, aluminum powder, nickel powder; conductive whiskers such as potassium titanate whiskers; conductive metal oxide such as titanium oxide; or polyphenylene derivatives, etc.

Here, the conductive agent may have an average particle diameter ($D_{50}$) of 10 μm or less, specifically 0.01 μm to 10 μm, and more specifically 0.01 μm to 1 μm. Here, when the average particle diameter of the conductive agent exceeds 10 μm, the dispersibility is poor so that the effect of improvement in conductivity resulted from addition of graphite powder is insignificant. Thus, the conductive agent having an average particle diameter exceeding 10 μm is undesirable.

In the present invention, the average particle diameter ($D_{50}$) of the conductive agent may be defined as a particle diameter corresponding to 50% of the cumulative number of particles in the particle diameter distribution curve of the particles. The average particle diameter ($D_{50}$) may be measured by, for example, a laser diffraction method. When using the laser diffraction method, it is possible to measure a particle diameter ranging from a submicron region to several millimeters, and it is thus possible to obtain results with high reproducibility and high degradability.

In addition, the specific surface area of the conductive agent may be 10 m$^2$/g to 1000 m$^2$/g. For example, specifically, the graphite the specific surface area of the carbon powder is 40 m$^2$/g to 80 m$^2$/g, and the specific surface area of the graphite powder is 10 m$^2$/g to 40 m$^2$/g, and the specific surface area of the graphite is smaller than that of the carbon powder, but the conductivity is superior to the carbon powder.

Here, as the specific surface area of the conductive agent becomes greater, the contact area of the conductive agent with the positive electrode active material becomes larger. As a result, the conductive path is easily formed between the positive electrode active material particles. However, when the specific surface area is excessively large, specifically, larger than 1000 m$^2$/g, there is a concern that the energy density of the positive electrode may be deteriorated due to the bulky structural feature. In contrast, when the specific surface area of the conductive agent is excessively small, specifically less than 100 m$^2$/g, there is a concern about a decrease in contact area of the conductive agent with the positive electrode active material and aggregation between the conductive agents. In the present invention, the specific surface area of the conductive agent may be defined as a value (BET specific surface area) measured by a nitrogen adsorption method.

Specific examples of such a commercially available conductive agent include acetylene black-based products such as Chevron Chemical Company or Denka black (Denka Singapore Private Limited), Gulf Oil Company, Ketjen black, EC-based (Armak Company products), Vulcan XC-72 (Cabot Company products), and Super P (Timcal Co. products).

The conductive agent is commonly added in an amount 1 to 15 wt %, and specifically 1 to 10 wt %, based on a total solid content of the positive electrode slurry.

In addition, the solvent may include an organic solvent such as N-methyl-2-pyrrolidone (NMP), and may be used in an amount satisfying a desirable viscosity when the positive electrode active material, and an optional binder and the conductive agent are included. For example, the solvent may be included such that the concentration of the solid content, which includes the positive electrode active material, and the optionally included binder and conductive agent, may be 10 to 90 wt %, and preferably 20 to 90 wt %.

In addition, the negative electrode may manufactured by forming a negative electrode mixture layer on a negative electrode current collector. The negative electrode mixture layer may be formed by coating the negative electrode current collector with a negative electrode slurry including a negative electrode active material, a binder, a conductive agent, and a solvent, and then drying and rolling the coated negative electrode current collector. Alternatively, a metal film itself may be used as a negative electrode.

The negative electrode current collector generally has a thickness of 3 to 500 μm. The negative electrode current collector is not particularly limited as long as having high conductivity without causing chemical changes in the battery, and, for example, may employ copper, stainless steel, aluminum, nickel, titanium, fired carbon, or copper or stainless steel that is surface-treated with carbon, nickel, titanium, silver, or the like, and an aluminum-cadmium alloy. In addition, as in the positive electrode current collector, the negative electrode current collector may have fine irregularities on the surface thereof to improve the bonding strength of a negative electrode active material, and the negative electrode current collector may be used in various shapes such as a film, a sheet, a foil, a net, a porous body, a foam body, and a non-woven fabric body.

The negative electrode active material may include at least one selected from the group consisting of a lithium metal, a carbon-based material capable of reversibly intercalating/deintercalating lithium ions, an alloy of lithium metal, a metal composite oxide, a material which may be doped and undoped with lithium, and a transition metal oxide.

The carbon-based material capable of reversibly intercalating/deintercalating lithium ions may employ a carbon-based negative electrode active material generally used in a lithium ion secondary battery without particular limitation, and, as a typical example, may employ crystalline carbon, amorphous carbon, or both thereof. Examples of the crystalline carbon may include graphite such as irregular, planar, flaky, spherical, or fibrous natural graphite or artificial graphite, and examples of the amorphous carbon may include soft carbon (low-temperature sintered carbon) or hard carbon, mesophase pitch carbide, and fired cokes.

The alloy of lithium metal may employ an alloy of lithium with a metal selected from the group consisting of Na, K, Rb, Cs, Fr, Be, Mg, Ca, Sr, Si, Sb, Pb, In, Zn, Ba, Ra, Ge, Al, and Sn.

The metal composite oxide may employ one selected from the group consisting of PbO, PbO$_2$, Pb$_2$O$_3$, Pb$_3$O$_4$, Sb$_2$O$_3$, Sb$_2$O$_4$, Sb$_2$O$_5$, GeO, GeO$_2$, Bi$_2$O$_3$, Bi$_2$O$_4$, Bi$_2$O$_5$, Li$_x$Fe$_2$O$_3$(0≤x≤1), Li$_x$WO$_2$(0≤x≤1), and Sn$_x$Me$_{1-x}$Me'$_y$O$_z$ (Me: Mn, Fe, Pb, Ge; Me': Al, B, P, Si, Groups I, II and III elements of the periodic table, or halogen; 0<x≤1; 1≤y≤3; 1≤z≤8).

The material, which may be doped and undoped with lithium, may employ Si, SiO$_x$, (0<x≤2), a Si—Y alloy (where Y is an element selected from the group consisting of alkali metal, alkaline earth metal, a Group 13 element, a Group 14 element, transition metal, a rare earth element, and a combination thereof, and excludes Si), Sn, SnO$_2$, and Sn—Y (where Y is an element selected from the group consisting of alkali metal, alkaline earth metal, a Group 13 element, a Group 14 element, transition metal, a rare earth element, and a combination thereof, and excludes Sn), and a mixture of SiO$_2$ and at least one thereof may also be used. The element Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal may employ lithium-containing titanium composite oxide (LTO), vanadium oxide, and lithium vanadium oxide.

The negative electrode active material may be included in an amount 70 to 98 wt %, and particularly 80 to 98 wt %, based on a total solid content of the negative electrode slurry.

The binder is a component that assists in binding between a conductive agent, an active material, and a current collector. Particularly, the binder, may employ, polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluorine rubber, and various copolymers thereof.

The binder is commonly added in an amount 1 to 15 wt %, and specifically 1 to 10 wt %, based on a total solid content of the negative electrode slurry.

The conductive agent is a component for further improving the conductivity of a negative electrode active material, and is not particularly limited as long as having a conductivity without causing chemical changes in the battery, and may employ, for example, a conductive agent such as: graphite such as natural graphite or artificial graphite; carbon black such as acetylene black, Ketjen black, channel black, furnace black, lamp black, and thermal black; conductive fibers such as carbon fibers and metal fibers; metal powder such as carbon fluoride powder, aluminum powder, nickel powder; conductive whiskers such as zinc oxide whiskers and potassium titanate whiskers; conductive metal oxide such as titanium oxide; or polyphenylene derivatives.

The conductive agent is added in an amount 1 to 15 wt %, and particularly 1 to 10 wt %, based on a total solid content of the negative electrode slurry.

The solvent may include water or an organic solvent, such as N-methyl-2-pyrrolidone (NMP), and may be used in an amount satisfying a desirable viscosity when the negative electrode active material, and an optional binder and the conductive agent are included. For example, the solvent may be included such that the concentration of the solid content, which includes the negative electrode active material, and the optionally included binder and conductive agent, may be 10 to 90 wt %, and preferably 20 to 90 wt %.

In addition, the separator plays a role in blocking an internal short circuit between both electrodes and being impregnated with the electrolyte. The separator may be formed by mixing a polymer resin, a filler, and a solvent to prepare a separator composition, then directly coating the electrode with the separator composition, and drying the separator composition to form a separator film. Alternatively, the separator may be formed by casting and drying the separator composition on a support, and then laminating, on the electrode, a separator film peeled off from the support.

The separator may use typically used porous polymer film, which has been conventionally used as a separator. The separator may use, alone or in a laminated form, a porous polymer film formed from, for example, a polyolefin-based polymer, such as an ethylene homopolymer, a propylene homopolymer, an ethylene/butene copolymer, an ethylene/hexene copolymer, and an ethylene/methacrylate copolymer, or may use a typical porous non-woven fabric, for example, a non-woven fabric formed of high-melting-point glass fibers, or polyethylene terephthalate fibers. However, the separator is not limited thereto.

Here, the porous separator may generally have a pore diameter of 0.01 μm to 50 μm and a porosity of 5% to 95%. Also, the porous separator may generally have a thickness in a range of 5 μm to 300 μm.

The outer shape of the lithium secondary battery of the present invention is not particularly limited, and thus a cylindrical shape using a can, a prismatic shape, a pouch shape, or a coin shape, may be used.

MODE FOR CARRYING OUT THE INVENTION

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

A non-aqueous electrolyte solution for a lithium secondary battery was prepared by adding 0.05 g of an oligomer (weight average molecular weight (Mw): 3,000, m1=9, m3=10, x=1) represented by Formula 1a, into 9.95 g of an electrolyte solution in which 0.7 M of $LiPF_6$ and 0.5 M of LiFSI were dissolved in a mixture obtained by mixing, at a weight ratio of 3:4:2:1, ethylene carbonate (EC), ethyl methyl carbonate (EMC), cation (Pyr13) represented by Formula 2-2α-anion (bis(fluorosulfonyl)imide anion, hereinafter referred to as FSI anion), and a phosphite-based additive represented by Formula 3-1a).

Example 2

A non-aqueous electrolyte solution for a lithium secondary battery was prepared in the same manner as in Example 1 except that, ethylene carbonate (EC), ethyl methyl carbonate (EMC), cation (Pyr13) represented by Formula 2-2a-anion (FSI anion), and a phosphite-based additive represented by Formula 3-1a were mixed at a weight ratio of 3:4:1:2.

Example 3

A non-aqueous electrolyte solution for a lithium secondary battery was prepared in the same manner as in Example 1 except that, a phosphite-based additive represented by Formula 3-1b, instead of the phosphite-based additive represented by Formula 3-1a, was used as a phosphite-based additive unlike Example 1.

Example 4

A non-aqueous electrolyte solution for a lithium secondary battery was prepared in the same manner as in Example 1 except that, cation represented by Formula 2-1a, instead of the cation (Pyr13) represented by Formula 2-2a, was used as a cation unlike Example 1.

Comparative Examples

Comparative Example 1

A non-aqueous electrolyte solution for a lithium secondary battery was prepared by mixing ethylene carbonate (EC) and ethyl methyl carbonate (EMC) at a weight ratio of 3:7, and then dissolving 0.7 M of $LiPF_6$ and 0.5 M of LiFSI.

Comparative Example 2

A non-aqueous electrolyte solution for a lithium secondary battery was prepared by adding 0.05 g of an oligomer (weight average molecular weight (Mw): 3,000, m1=9, m3=10, x=1) represented by Formula 1a, into 9.95 g of an electrolyte solution in which 0.7 M of $LiPF_6$ and 0.5 M of LiFSI were dissolved in a mixture obtained by mixing, at a weight ratio of 3:4:3, ethylene carbonate (EC), ethyl methyl carbonate (EMC), cation (Pyr13) represented by Formula 2-2a-anion (FSI anion).

Comparative Example 3

A non-aqueous electrolyte solution for a lithium secondary battery was prepared by adding 0.05 g of an oligomer (weight-average molecular weight (Mw): 3,000, m1=9, m3=10, and x=1) represented by Formula 1a, into 9.95 g of an electrolyte solution in which 0.7 M of $LiPF_6$ and 0.5 M of LiFSI were dissolved in a mixture obtained by mixing, at a weight ratio of 3:6:1, ethylene carbonate (EC), ethyl methyl carbonate (EMC), a phosphite-based additive represented by Formula 3-1a.

Manufacturing Example

1. Manufacturing Example 1: Manufacture of Lithium Secondary Battery (1) Manufacture of Positive Electrode $LiNi_{0.6}Co_{0.2}Mn_{0.2}O_2$ (NCM 622) as a positive electrode active material, carbon black as a conductive agent, and polyvinylidene fluoride (PVDF), as a binder, were added into N-methyl-2-pyrrolidone (NMP), at a weight ratio of 85:6:9 to prepare 60 wt % solid content of a positive electrode slurry. An aluminum (Al) thin film having a thickness of about 20 μm, as a positive electrode current collector, was coated with the positive electrode slurry and dried, and then roll-pressed to manufacture a positive electrode.

(2) Manufacture of Negative Electrode 96 wt % of carbon powder as a negative electrode active material, 3 wt % of PVDF as a binder, and 1 wt % of carbon black as a conductive agent were mixed and then added into NMP which was a solvent to prepare 80 wt % solid content of a negative electrode slurry. A copper (Cu) thin film having a thickness of about 10 μm, as a negative electrode current collector, was coated with the negative electrode slurry and dried, and then roll-pressed to manufacture a negative electrode.

(3) Manufacture of Lithium Secondary Battery

An electrode assembly was manufactured by disposing and a separator formed of three layers of polypropylene/polyethylene/polypropylene (PP/PE/PP) between the prepared positive electrode and negative electrode, and laminating in order.

The assembled electrode assembly was housed in the battery case, and the non-aqueous electrolyte solution for a lithium secondary battery manufactured in Examples 1 to 4 and Comparative Examples 1 to 3 was respectively injected into the battery case, and stored at room temperature for 2 days to manufacture a lithium secondary battery.

2. Manufacturing Example 2: Manufacture of Lithium Secondary Battery

During the manufacture of the lithium secondary battery, a positive electrode material and a lithium secondary battery were manufactured in the same manner as in Example 1 except that, $LiCoO_2$(LCO) was used as a positive electrode active material.

Experimental Examples

1. Experimental Example 1. Experiments for Evaluating Oxidation Stability

A platinum (Pt) disc electrode used as a working electrode, a lithium metal used as a reference electrode, and a platinum (Pt) wire electrode used as an auxiliary electrodes, were immersed in each of a non-aqueous electrolyte solution prepared in Examples 1 to 4, in a non-aqueous electrolyte solution prepared in Comparative Examples 1 and 3, and then the generated oxidative degradation electrical potentials was measured under a glove box filled with in an argon (Ar) having a moisture and oxygen concentration of 10 ppm or less, by using a linear sweep voltammetry method at a scan rate of 20 mV/s, and the results thereof are presented in Table 1.

TABLE 1

|  | Generated oxidative degradation electrical potentials (V) |
| --- | --- |
| Example 1 | 5.2 |
| Example 2 | 5.0 |
| Example 3 | 5.3 |
| Example 4 | 5.1 |
| Comparative Example 1 | 4.7 |
| Comparative Example 2 | 5.1 |
| Comparative Example 3 | 4.6 |

Referring to Table 1, since the Examples 1 to 4 using an ionic solution has the high oxidative safety, it can be ascertained that Examples 1 to 4 using an ionic solution exhibit high generated oxidative degradation electrical potentials, compare to Comparative Examples 1 and 3 using no ionic solution.

2. Experimental Example 2. Experiments for Evaluating Flame Retardancy

The flame retardancy was measured by evaluating whether the occurrence of ignition by the method for dropping 2 ml of non-aqueous electrolyte solution prepared according to Example 1 to 4 and 2 ml of non-aqueous electrolyte solution prepared according to Comparative Example 1 to 3 on an aluminum dish and then bring a flame. The results thereof are presented in Table 2.

TABLE 2

|  | occurrence of ignition |
| --- | --- |
| Example 1 | X |
| Example 2 | X |
| Example 3 | X |
| Example 4 | X |
| Comparative Example 1 | 0 |
| Comparative Example 2 | Δ |
| Comparative Example 3 | Δ |

In Table 2, X indicates the case where when a flame is brought near the sample, the sample does not catch on fire, or the flame extinguishes within 2 seconds after catching on fire, A indicates the case where when a flame is brought near the sample, the flame extinguishes within 2-4 seconds, 0 indicates the case where when a flame is brought near the sample, the flame burns for more than 5 seconds.

The ionic solution has a flame retardancy, thereby improving a flame retardancy of an electrolyte. Also, the phosphite-based additive acts as an oxygen radical scavenger, so that an oxygen radical which may occur an oxidation reaction of an electrolyte may be removed, thereby suppressing an oxidation reaction of the electrolyte which can carry over into an ignition reaction. Thus, it can be ascertained that the flame retardancy and the incombustibility of Examples 1 to 4 are superior to Comparative Examples because the electrolyte does not ignite at all due to synergistic effects between such an ionic liquid and the phosphite-based additive.

3. Experimental Example 3: Experiments for Evaluating Life Characteristics

The electrolytes according to Examples 1 to 4 and Comparative Examples 1 to 3 were applied to the lithium secondary batteries manufactured in Manufacturing Example 1, and the batteries were performed a formation with 100 mA current (0.1 C rate), and were repeated in 100 cycles of charging until 4.2 V 333 mA (0.3 C, 0.05 C cut-off) CC/CV and discharging until 3 V 333 mA (0.3 C) CC, and discharge capacity after $100^{th}$ cycle, and the initial capacity (discharge capacity at the first cycle) were selected. The results thereof are presented in Table 3.

TABLE 3

| | Capacity retention after $100^{th}$ cycles (%) |
|---|---|
| Example 1 | 95 |
| Example 2 | 96 |
| Example 3 | 96 |
| Example 4 | 93 |
| Comparative Example 1 | 90 |
| Comparative Example 2 | 92 |
| Comparative Example 3 | 91 |

Looking at Table 3, the lithium secondary batteries of the Examples exhibit better capacity retention rate than the lithium secondary batteries of the Comparative Examples, this is because the oxidation stability of the Example is more excellent, which results in inhibition of electrolyte deterioration in the course of the cycle.

4. Experimental Example 4: Measurement of an Amount of Heat Generated of Positive Electrode The electrolytes according to Examples 1 to 4 and Comparative Examples 1 to 3 were used to the lithium secondary batteries manufactured in manufacturing Example 1, and the formation was carried out at a current of 100 mA (0.1 C rate), and then the batteries were disassembled in a fully charged-state, SOC (state of charge) of 100%, and then the positive electrode was measured by a differential scanning calorimeter (DSC). The measurement conditions were from 25° C. to 400° C., and the measurement was carried out by 10° C./min. The experiment was repeated twice in the same sample. The results thereof are presented in Table 4 below.

TABLE 4

| Sample | Runaway temperature (° C.) | Amount of heat generated (J/g) |
|---|---|---|
| Example 1 | 290 | 30 |
| Example 2 | 290 | 20 |
| Example 3 | 285 | 35 |
| Example 4 | 280 | 40 |
| Comparative Example 1 | 270 | 100 |
| Comparative Example 2 | 280 | 95 |
| Comparative Example 3 | 265 | 60 |

Generally, when the charged-state, the structure of the positive electrode active material in the positive electrode is structurally unstable because lithium is deintercalated. Therefore, when the charged-state positive electrodes are left standing at a high temperature, the positive electrode active material structure collapses and oxygen radicals are generated thereby occurring exothermic reaction. Here, the generated oxygen radicals are highly reactive, thereby exothermically reacting with the electrolyte.

Looking at Table 4, it may be understood that exothermic reaction of the lithium secondary battery according to Comparative Example 1 begins at 2700 C by the structural collapse of the positive electrode active material and by the reaction between the oxygen radicals thus generated and the electrolyte, and the amount of heat generated of the lithium secondary battery according to Comparative Example 1 is also high, 100 J/g.

In contrast, it may be understood that the lithium secondary battery according to Example 1 to 4 have lowered runaway temperature and also have decreased amount of heat generated, since the ionic liquid suppresses the structural collapse of the positive electrode active material, and the phosphite-based additive removes oxygen radicals to reduce the electrolyte exothermic reaction.

Meanwhile, when only an ionic solution presented as in Comparative Example 2, the runaway temperature was slightly higher, so that the exothermic reaction was controlled, but still a large amount of heat was generated, and when only the phosphite-based additive presented as in Comparative Example 3, the amount of heat generated was slightly reduced, but the exothermic reaction was not controlled because the runaway temperature was low and the positive active material easily collapses under high temperature conditions, so the safety of the lithium secondary battery was low.

5. Experimental Example 5: Measurement of an Amount of Heat Generated of Positive Electrode The electrolytes according to Examples 1 to 4 and Comparative Examples 1 to 3 were used to the lithium secondary batteries manufactured in manufacturing Example 2, and the formation was carried out at a current of 100 mA (0.1 C rate), and then the batteries were disassembled in a fully charged-state, SOC of 100, and then the positive electrode was measured by a differential scanning calorimeter (DSC). The measurement conditions were from 25° C. to 4000 C, and the measurement was carried out by 10 C/min. The experiment was repeated twice in the same sample. The results thereof are presented in Table 5 below.

TABLE 5

| Sample | Runaway temperature (° C.) | Amount of heat generated (J/g) |
|---|---|---|
| Example 1 | 275 | 60 |
| Example 2 | 275 | 40 |
| Example 3 | 280 | 55 |
| Example 4 | 270 | 60 |
| Comparative Example 1 | 250 | 150 |
| Comparative Example 2 | 270 | 135 |
| Comparative Example 3 | 250 | 70 |

Experimental Example 5 was conducted in the same manner as in Experimental Example 4 except that, the positive electrode active material was different unlike Experimental Example 4, and the result exhibits a similar tendency, except that, overall runaway temperature was low and the amount of heat generated was large.

Referring to Table 5, it can be confirmed that the exothermic reaction of the lithium secondary battery according to Comparative Examples 1 and 3 occurs more easily, since the batteries generate heat at a low temperature so that the structural collapse of the positive electrode active material occurs more easily. Meanwhile, although Comparative Example 2 shows a runaway temperature similar to those shown in Examples, it can be found that the safety of the battery was deteriorated because a series of exothermic reactions occurred without being suppressed due to a large amount of heat generated.

The invention claimed is:

1. A non-aqueous electrolyte solution for a lithium secondary battery, the electrolyte solution comprising:
   an ionic solution including at least one anion selected from the group consisting of a bis(fluorosulfonyl)imide anion and a bis(trifluoromethane)sulfonylimide anion, a cation, and a non-aqueous solvent;
   a lithium salt;
   a phosphite-based additive; and
   a surfactant including an oligomer represented by Formula 1 below,

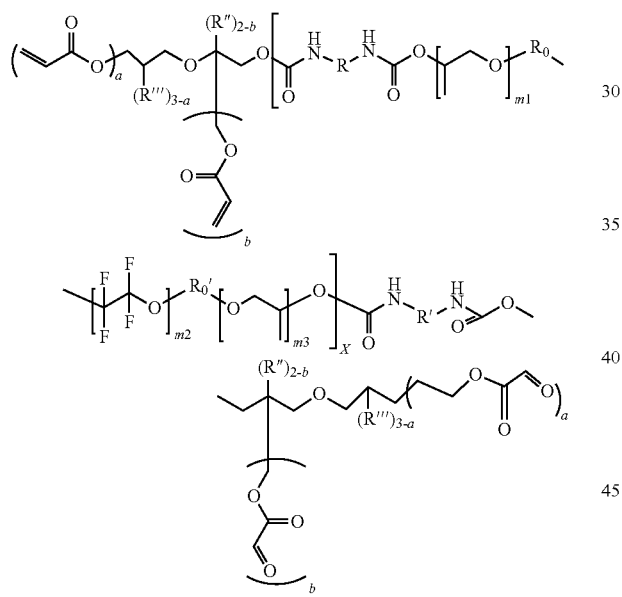

[Formula 1]

wherein, in Formula 1,
   $R_0$ and $R_0'$ are each independently a substituted or unsubstituted alkylene group having 1 to 5 carbon atoms,
   R and R' are each independently an aliphatic, alicyclic or aromatic hydrocarbon group,
   R'' and R''' are each independently hydrogen or an alkyl group having 1 to 3 carbon atoms,
   a is an integer of 1 to 3,
   b is an integer of 0 to 2,
   m1 and m3 are each independently an integer selected from among 1 to 15,
   m2 is an integer selected from among 1 to 10, and
   x is an integer selected from among 1 to 15.

2. The non-aqueous electrolyte solution for a lithium secondary battery according to claim 1,
   the cation is one selected from the group consisting of cations represented by Formulae 2-1 to 2-5 below,

[Formula 2-1]

wherein, in Formula 2-1, $R_1$, $R_2$, $R_3$ and $R_4$ are each independently hydrogen or an alkyl group having 1 to 10 carbon atoms,

[Formula 2-2]

wherein, in Formula 2-2, $R_5$ and $R_6$ are each independently hydrogen or an alkyl group having 1 to 10 carbon atoms,

[Formula 2-3]

wherein, in Formula 2-3, $R_7$ and $R_8$ are each independently hydrogen or an alkyl group having 1 to 10 carbon atoms,

[Formula 2-4]

wherein, in Formula 2-4, $R_9$, $R_{10}$, $R_{11}$ and $R_{12}$ are each independently hydrogen or an alkyl group having 1 to 10 carbon atoms, and

[Formula 2-5]

wherein, in Formula 2-5, $R_{13}$, $R_{14}$, $R_{15}$ and $R_{16}$ are each independently hydrogen or an alkyl group having 1 to 10 carbon atoms.

3. The non-aqueous electrolyte solution for a lithium secondary battery according to claim 1,
   wherein, the cation is at least one cation selected from the group consisting of cations represented by Formulae 2-1a and 2-1b below,

[Formula 2-1a]

[Formula 2-1b]

4. The non-aqueous electrolyte solution for a lithium secondary battery according to claim 1,
wherein, the cation is at least one cation selected from the group consisting of cations represented by Formulae 2-2a and 2-2b below,

[Formula 2-2a]

[Formula 2-2b]

5. The non-aqueous electrolyte solution for a lithium secondary battery according to claim 1,
wherein, the cation is at least one cation selected from the group consisting of cations represented by Formulae 2-3a and 2-3b below,

[Formula 2-3a]

[Formula 2-3b]

6. The non-aqueous electrolyte solution for a lithium secondary battery according to claim 1,
wherein, the cation is a cation represented by Formula 2-5a below,

[Formula 2-5a]

7. The non-aqueous electrolyte solution for a lithium secondary battery according to claim 1,
wherein, the phosphite-based additive comprises a compound represented by Formula 3-1,

[Formula 3-1]

wherein, in Formula 3-1,
$R_{17}$, $R_{18}$ and $R_{19}$ are each independently at least one functional group selected from the group consisting of hydrogen, fluorine, chlorine, bromine, iodine, —$CF_3$, —$CH_2CF_3$, —$CF_2CCl_3$, —$C(CF_3)_3$, —$C(CF_2F_3)_3$, —$Si(CH_3)_3$, —$Si(CH_2CH_3)_3$, —$Si(CH_3)_3$, —$Si(CF_3)_3$, —$Si(CF_2CF_3)_3$, —$CCl_3$, —$CCl_2CCl_3$, —$C(CCl_3)_3$, —$C(CCl_2Cl_3)_3$, —$CBr_3$, —$CBr_2CBr_3$, —$C(CBr_3)_3$, —$C(CBr_2Br_3)_3$, —$CI_3$, —$CI_2CI_3$, —$C(CI_3)_3$ and —$C(CI_2CI_3)_3$.

8. The non-aqueous electrolyte solution for a lithium secondary battery according to claim 1,
wherein, the phosphite-based additive is at least one compound selected from the group consisting of Formulae 3-1a and 3-1b below,

[Formula 3-1a]

[Formula 3-1b]

9. The non-aqueous electrolyte solution for a lithium secondary battery according to claim 1,
wherein, the oligomer represented by Formula 1 is an oligomer represented by Formula 1a below,

[Formula 1a]

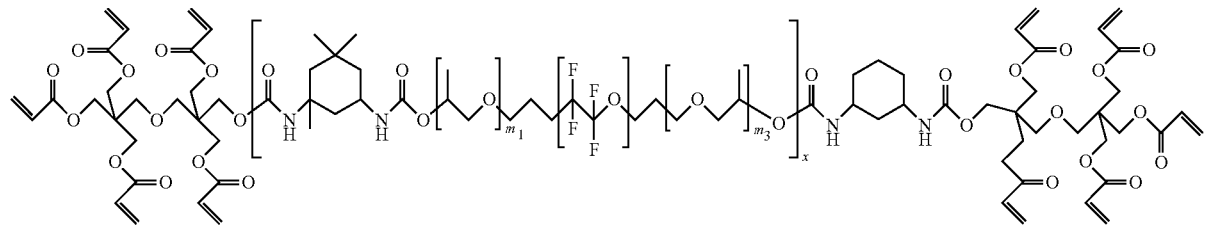

wherein, in Formula 1a,
m1 and m3 are each independently an integer selected from among 1 to 15, and
x is an integer selected from among 1 to 15.

10. A lithium secondary battery comprising:
a positive electrode;
a negative electrode;
a separator disposed between the positive electrode and the negative electrode; and
the non-aqueous electrolyte solution for a lithium secondary battery according to claim 1.

11. The non-aqueous electrolyte solution for a lithium secondary battery according to claim 1, wherein the non-aqueous solvent includes a cyclic carbonate, a linear carbonate or a mixture thereof.

* * * * *